No. 638,893. Patented Dec. 12, 1899.
C. E. VERNON & A. ROSS.
ELECTROMECHANICAL INDICATING AND RECORDING APPARATUS.
(Application filed Dec. 24, 1897.)
(No Model.)
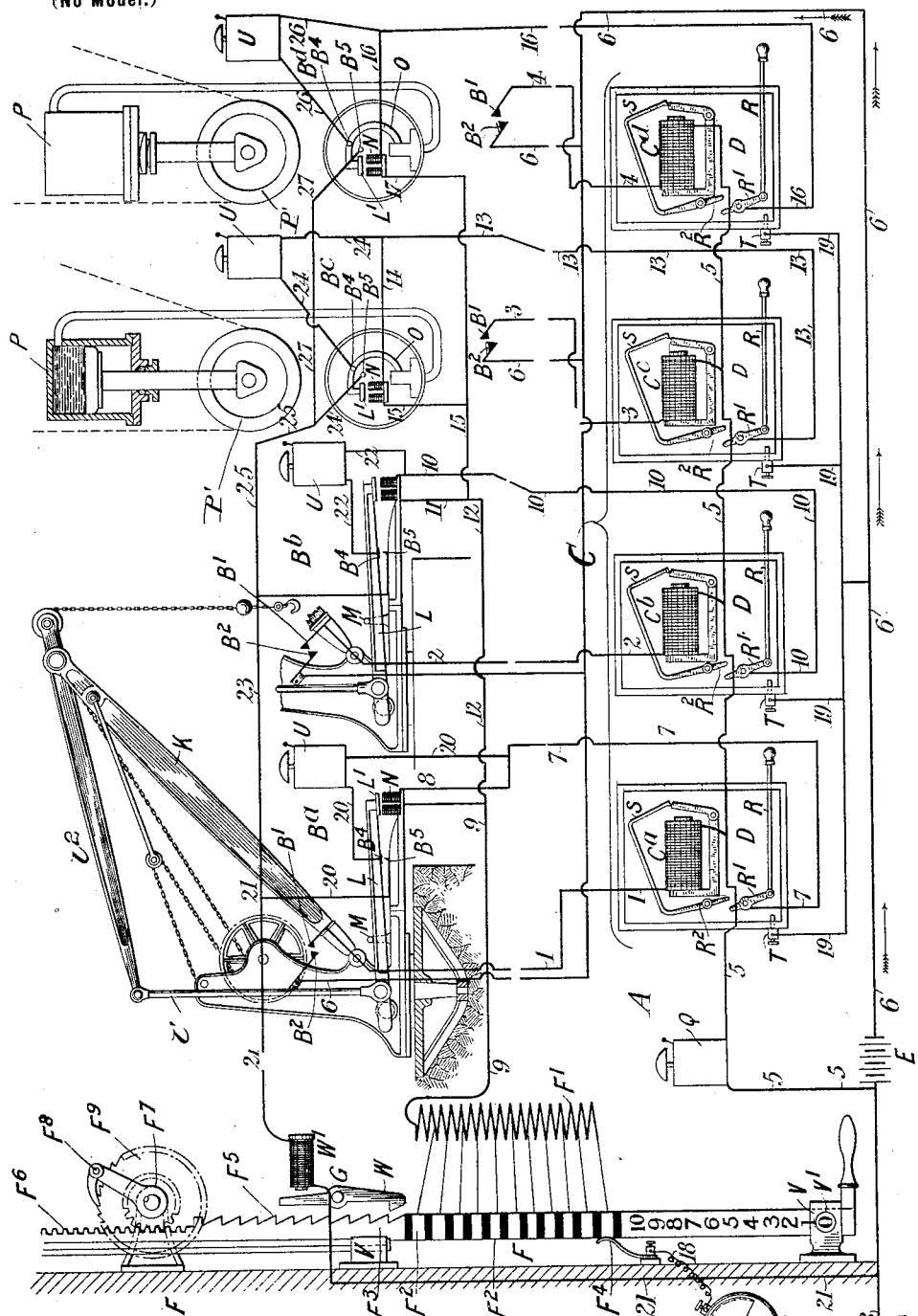
Witnesses:
J. M. Fowler Jr.
Thomas Durant
Inventors
Charles E. Vernon
Arthur Ross
by Church & Church
Their Attorneys.
THE NORRIS PETERS CO., PHOTO-LITHO., WASHINGTON, D. C.

United States Patent Office.

CHARLES E. VERNON, OF LONDON, AND ARTHUR ROSS, OF SUTTON, ENGLAND.

ELECTROMECHANICAL INDICATING AND RECORDING APPARATUS.

SPECIFICATION forming part of Letters Patent No. 638,893, dated December 12, 1899.

Application filed December 24, 1897. Serial No. 663,425. (No model.)

*To all whom it may concern:*

Be it known that we, CHARLES EDWARD VERNON, residing at Plaistow, London, and ARTHUR ROSS, residing at Sutton, England, subjects of the Queen of England, have invented certain new and useful Improvements in or Relating to Electromechanical Indicating and Recording Apparatus, (for which we have obtained Letters Patent in England, No. 14,170, dated July 25, 1895,) of which the following is a specification.

This invention relates to electromechanical indicating and recording apparatus suited for employment with weighing or measuring apparatus or with other indicators or the like, its object being the construction of apparatus whereby the indication of a weighing or measuring machine or indicating device for pressures, temperature, depth of water, or other measurement can be transmitted from the place at which the device is in action to a central or other station at which the indication will be repeated and also, if desired, automatically recorded.

In the accompanying drawing, the figure is a diagram illustrating the application of this invention to a group of weighing apparatus, each member of the group having a steelyard or equivalent to which an electromagnetic circuit-closing device is applied for the obtainment of an indication of weight in a manner hereinafter explained.

Like letters and figures indicate like parts throughout the drawing.

The apparatus at the left hand and lower portions of the figure is to be regarded as situated at a central station A, at which indications of weight transmitted from distant stations are to be read. The distant stations at which the weight indications originate are lettered $B^a$, $B^b$, $B^c$, and $B^d$, respectively, there being four such stations in the present example. The apparatus at each distant station is preferably mounted on the weighing apparatus there, it being assumed for the purposes of this specification that a crane is the type of apparatus employed.

The central-station apparatus comprises an annunciator C, by which the attention of the central-station attendant is directed to any one of the distant stations at which a weight is ready for indication; circuit-closing appliances D, by which the attendant directs current from a battery E or other source of electric energy through that distant station; a variable-resistance apparatus F, by which the amount of that current is varied until it bears the desired ratio to the load upon the crane at the distant station, and an automatic locking device G, by which movement of the variable-resistance apparatus F is stopped at the instant that it has removed sufficient resistance from lines to bring up the current to the ratio referred to. By thus combining the variable-resistance apparatus F with the automatic locking device G the movement of the former affords a measure of the load. If desired, an ampere-meter H can be employed in conjunction with the apparatus F to afford a check on the indications of the latter. If such a meter is used, it should be so arranged that the needle, in order to afford time for booking the reading, will not return to zero after it is moved to give an indication until specially released.

Each section of the annunciator C is preferably combined with one of the circuit-closers D in a single apparatus of the kind illustrated in the accompanying drawing.

The apparatus at each of the distant stations $B^a$ and $B^b$ comprises an automatic circuit-closer of any suitable type, which operates on the lifting of the crane-jib K to move the load into a position in which it is ready for measurement or which otherwise comes into action upon or during the elevation of the load itself to a predetermined position and completes momentarily a circuit comprising the central-station annunciator C, a steelyard L, (controlled by the load in a manner well understood and held by the load against a stop M with more or less force, corresponding to the magnitude of the load at any moment,) and an electromagnet N, disposed in proximity to an armature L' on the longer arm of the steelyard. The illustration of the crane at the station $B^a$ and of the steelyard-gear thereon is merely diagrammatical, being so drawn to facilitate comprehension of the manner in which they operate. The steelyard L is held with a force proportional to the load against a stop M. This action is brought about in a well-known way by lever $l\ l'$, pivoted to the steelyard L and crane-jib K, respectively. The gap between the pole of each electromagnet N and its armature is a small one, and the quantity of current required to set up a magnetic action sufficient to draw the armature across the gap into contact with the pole of the electromagnet depends upon the force holding the steelyard against the stop M, and consequently upon the load.

In the apparatus at the distant stations $B^c$ and $B^d$ a Bourdon tube O is substituted for the steelyard. Its interior is in communication with a weighing-cylinder P of the usual or other convenient type, in which and in the tube the pressure will vary in proportion to the load on the crane. One well-known method of effecting this would be to provide the ram of the weighing-cylinder with a pulley P', around which a chain (shown as a dotted line) passes. If one end of this chain be rigidly fixed and the load applied to the other end, the force tending to move the ram upward will naturally be proportional to the load. The free end of the Bourdon tube carries or controls an armature L' in proximity to an electromagnet N. The width of the gap between the armature and the electromagnet is varied according to the variation of curvature of the Bourdon tube by the pressure set up within it by the action of the load, and as the quantity of current required to set up magnetic action sufficient to draw the armature across the gap into contact with the pole of the electromagnet depends upon the width of the gap the amperage of the current will in this instance also afford the measure of the load, the width of the gap being determined by the load, as aforesaid.

Although the electromagnetically-controlled Bourdon tube is shown in the drawing in connection with the same indicator as the steelyard L, it is merely shown thus, by way of example, as illustrating an alternative form of testing device, it not being intended that the two should be used in the same electric circuit.

The details of the central-station and distant-station apparatus will now be described, together with the manner in which they are electrically connected. $B'\ B^2$ are the terminals on each crane, each of the terminals $B'$ being carried, for instance, by the jib K, so as to move therewith, while the terminals $B^2$ are stationary on the crane-post. These contacts should be so arranged that they only operate to transmit current as the jib is raised and not when it is lowered. This may be conveniently accomplished by placing a shield of insulating material on the upper side of the contact $B^2$. From the terminals $B'$ leads 1 2 3 4 proceed, respectively, to the annunciator-electromagnets $C^a\ C^b\ C^c\ C^d$, individually allotted to the distant stations, as indicated by the corresponding suffixes. From the electromagnets $C^a\ C^b\ C^c\ C^d$ a conductor 5, in which is a bell Q, extends to the battery E, whence a conductor 6 extends to the terminals $B^2$. To each annunciator-electromagnet is allotted a push-rod R, which is arranged to restore the indicating-disk S to its normal position after each exposure thereof by the adjacent electromagnet and also to close gaps which normally exist between the ends of pivoted levers $R'\ R^2$ in the annunciator and fixed contacts T therein, these levers and the contacts T being included in one or other of the circuits 7 8 9 or 10 11 12 9 or 13 14 15 12 9 or 16 17 15 12 9, in which variable-resistance coils F' of the apparatus F and one or other of the electromagnets N are included. The coils F' are connected to one side of the battery E through one or other of the insulated sections $F^2$ of a sliding bar $F^3$ by way of a spring-contact $F^4$ and lead 18, in which an ampere-meter H may be inserted. From the opposite side of the battery a lead 6 19 extends to the stationary annunciator-terminals T.

From the drawing it will be seen that the bar $F^3$ is adapted to slide in fixed guides V through a hole V', in one of which the numbers marked on the bar $F^3$ are exposed in turn as the bar is moved up or down. On the upper end of the bar are ratchet-teeth $F^5$, corresponding with the insulated sections $F^2$ at the central portion of the bar and adapted to be engaged by one end of an armature W, so formed as to serve the purpose of a pawl, the armature being controlled by an electromagnet W' inserted in the lead 21. From the leads 7 10 13 16, respectively, extend shunt-circuits 20 21 or 22 23 21 or 24 25 23 21 or 26 27 25 23 21, each comprising a bell U and interrupted between terminals $B^4\ B^5$, one on the steelyard or Bourdon tube and the other on a fixed support with which the steelyard or tube makes contact when the current energizing the adjacent electromagnet N is sufficiently strong to cause the gap beneath the corresponding armature to close.

From the foregoing it will be seen that by moving the bar $F^3$ downward in its guides V its insulated sections $F^2$ will remove more and more of the resistance F' from the circuits containing the electromagnets N, and so vary the amount of current therein, such variation, and consequently (as has been hereinbefore explained) the load, being indicated by the numeral exposed at the opening V' in the guide V. As soon as the electromagnet W' is energized it operates the armature W to engage with that one of the teeth $F^5$ which may happen to be opposite to it, and so prevents the further descent of the bar $F^3$. This locking of the bar occurs, as will hereinafter appear, immediately upon the drawing down of the armature L' of the electromagnet N at the distant station. The ampere-meter H, if used, should have a damping device which would release the needle of the meter when the latter moved to give an indication, but which would lock the needle as soon as the current ceased and hold it while the reading was taken. This could be done electromagnetically.

The upper end of the bar F³ can be extended, as shown, to form a rack F⁶, which by means of a pinion F⁷, operating a pawl F⁸, drives the driving-wheel F⁹ of a counter, such as a Harding counter or the like, which totals the indications of weight afforded by successive operations of the bar F³.

The operation of these devices occurs as follows: Assuming that the jib of the crane at the distant station Bᵃ, for instance, is lifted, the contact B' rubs over the contact B², momentarily closing the circuit E 6 B² B' 1 Cᵃ 5 Q 5 E, thus ringing the bell Q and causing the annunciator-disk S of the electromagnet Cᵃ to be exposed to the view of the central-station attendant, so that he may know that the crane at Bᵃ has lifted a weight which requires indicating. Upon receipt of this signal the attendant pushes the rod R appropriated to section Cᵃ of the annunciator (incidentally returning the annunciator-disk to its normal position) closing the circuit E 6 19 T R' 7 8 N 9 F' F² F⁴ 18 H 18 E. It is to be understood that before the weighing is taken the bar F³ is always put at the higher limit of its travel—that is to say, the position in which it is shown in the drawing. This being so, during the operation just explained the completion by way of the electromagnet N of the circuit referred to will primarily have but little effect, as the whole of the resistance F' will be included therein. Next the bar F³ is drawn down, thereby removing successive sections of the resistance F' from that circuit and increasing the amount of current flowing through the electromagnet N until the latter becomes sufficiently energized to draw down the armature L' above it. Upon this the contact B⁴, coming down with the armature, immediately closes the circuit E 6 19 T R' 7 20 U 20 B⁴ B⁵ 20 21 W' 21 E, energizing the electromagnet W' and causing it to prevent by the armature-pawl W any further descent of the bar F³, whose indication can then be read off at V' and checked by the amperemeter H, if the latter be used. Simultaneously with the operation of the armature W by the electromagnet W' the crane-bell U in the same circuit is sounded and intimates to the crane-man that he may dispose of the load. The bar F³ is moved up to its normal position upon the completion of the operation, thus returning the whole of the resistance F' into line and restoring by the inclined faces of the teeth F⁵ the armature W to a position of readiness for further service. After the bar F³ has been finally raised the push-rod R adjacent to the electromagnet Cᵃ will be restored by hand to its original position, in which it is shown in the drawing, thus cutting off the current in the circuit E 6 19 T R' 7 20 U 20 B⁴ B⁵ 21 W' 21 E.

It is to be clearly understood that although this invention has hereinbefore been described mainly in connection with steelyard and hydraulic weighing apparatus it is applicable with equal facility and advantage to one, two, or more devices (whether of the type previously referred to or not) giving indications of pressure, whether such pressure be that produced by a weight of goods on a crane or weighing-table, a depth of water, or otherwise. For example, with its aid the indications of barometric apparatus may readily be supervised from and recorded at a central station.

We claim—

1. In a weight or pressure indicating apparatus for transmitting from distant points to a central station indications of weight or pressure, the combination of a source of electric energy, an electromagnetic testing device at each distant point, circuits connecting the source of energy with the testing devices, a variable-resistance rheostat in circuit with the testing devices, annunciators, contacts on the testing devices leads connecting those contacts and the annunciators with a source of energy, a signal device and electromagnetic locking devices hunted across the testing-device circuit and signal-contacts on the testing device for automatically forming or breaking the continuity of this shunt-circuit; substantially as set forth.

2. In weight or pressure indicating apparatus for transmitting from distant points to a central station indications of weight or pressure, the combination of a source of electric energy, an electromagnetic testing device at each distant point, circuits connecting the source of energy with the testing devices, means at the central station for varying the current through the testing devices, signaling-contacts, and an electromagnetic locking device automatically operated by the testing device; substantially as set forth.

3. In weight or pressure indicating apparatus for transmitting from distant points to a central station indications of weight or pressure, a variable-resistance rheostat comprising a sliding bar F³ having insulated sections F² connected to a resistance F', a contact F⁴, guides for the bar, numbers upon the bar, ratchet-teeth F⁵, a pawl-armature W, an electromagnet W', a rack F⁶, pinions F⁷, pawl F⁸ and counter-wheel F⁹; substantially as set forth.

4. In a weight or pressure indicating apparatus, for transmitting from distant points to a central station indications of weight or pressure an electromagnetic testing device comprising a crane, contacts B' B² on the crane arranged to automatically close a circuit communicating with a source of energy and an indicator at the central station when the crane is brought into operation, a steelyard L L' raised by the load to be weighed, a stop M to limit the upward movement of the yard, an electromagnet N which when sufficiently excited draws down the yard L L' and a contact $B^4$ carried by the yard and operating in conjunction with a fixed contact $B^5$ so that notice is given when the yard descends by the contacts $B^4$ and $B^5$ closing a circuit; substantially as set forth.

In testimony whereof we have hereto set our hands in the presence of the two subscribing witnesses.

CHAS. E. VERNON.
ARTHUR ROSS.

Witnesses:
WALTER J. SKERTEN,
W. J. NORWOOD.